2,769,817
THERAPEUTIC SUBSTITUTED CHALCONES

Gustav J. Martin and Jay Morton Beiler, Philadelphia, and Souren Avakian, Oreland, Pa., assignors to The National Drug Company, Philadelphia, Pa., a corporation of Delaware No Drawing. Application June 7, 1951,
Serial No. 230,438

5 Claims. (Cl. 260—340.5)

This invention relates to therapeutic compounds, more particularly to compounds that are suitable for the treatment of certain physiological disorders involving body enzymes.

Among the objects of the present invention is the provision of compounds that are usually effective as inhibitors of the activity of xanthine oxidase, and are efficacious in the treatment of disorders such as gout, which result from such activity or over-activity.

It has been discovered that certain oxygenated chalcones markedly inhibit the activity of xanthine oxidase when added to this enzyme in concentrations as low as 0.1 microgram per cubic centimeter (cc.). In general these inhibitors are chalcones having the formula:

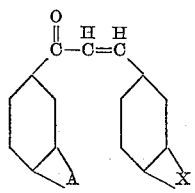

in which A represents substitution of the class consisting of two hydroxyl groups, two methoxy groups and one methylene dioxy group, and X represents substitution of the class consisting of two hydrogen groups, two hydroxyl groups, two methoxy groups and one methylene dioxy group.

Of these chalcones the most effective examples are 3,3',4,4'-tetrahydroxychalcone and its methyl ethers and methylenedioxydiethers. Specifically this tetrahydroxychalcone and its 3,4-methylenediether give good inhibition at the above mentioned low concentration of 0.1 microgram per cc. Other related compounds such as 3',4'-dihydroxychalcone and the completely methyl etherified products of these hydroxylated chalcones are also exceptionally active. It is a peculiar property of these substances that their in vivo activity seems completely specific to xanthine oxidase.

In gouty arthritis there is a direct deposit of crystalline uric acid in the joints. The characteristic symptoms of this disorder are associated with the irritant action of these deposits, as for example when the joints are flexed.

The deposited uric acid is a product of purine and pyrimidine metabolism in the body, and is directly formed by the action of the enzyme xanthine oxidase on purine and pyrimidine bodies. The above oxygenated chalcones provide an unusually strong reduction in activity of this enzyme both in vitro and in vivo. In vivo inhibition is demonstrable by measurement of the XO activity of rat liver after feeding. The in vitro tests were made after the technique described by Axelrod and Elvehjem in the Journal of Biological Chemistry, volume 140, the article beginning on page 725 (1941). Rat liver was used as a source of the enzyme. The liver was ground with sand in three volumes of 0.039 molar phosphate buffer pH 7.4, containing equal amounts of sodium and potassium ions. The homogenate was then centrifuged and the supernatant used in the experiment. The Warburg apparatus (see the above cited Axelrod et al. article) was used for determinations of the activity of the tissue extract. In the center cup were placed 1.7 cc. of the extract and 0.5 cc. of a solution of the compound being tested. The center well contained 0.4 cc. of 10% KOH and a small piece of rolled-up filter paper, while the side bulb contained 0.15 cc. of 0.05 M xanthine in 0.5 M NaOH.

The cups were attached to the manometers and allowed to come to temperature equilibrium (37° C.) for 10 minutes. The stopcocks were then closed and readings were taken every 10 minutes for 40 minutes in order to determine the rate of endogenous oxygen uptake of the tissue extract. At the end of the 40 minute period this figure had usually fallen to a low, constant value. The contents of the side bulb were then tipped into the center compartment and readings were taken at 15 minute intervals for 45 minutes. Controls were run without added xanthine to give figures for endogenous oxygen uptake. These blank figures were subtracted from those obtained with the cups containing xanthine and the difference was taken as being the oxygen uptake due to the oxidation of xanthine alone. Controls were also run without added inhibitors. A comparison of the oxygen uptake due to xanthine oxidation with and without the added substances showed whether there was any inhibitory effect. Xanthine oxidase activity was expressed in units (cubic millimeters of oxygen uptake per gram of dry liver, per hour) as suggested by Westerfeld and Richert in the Journal of Biological Chemistry, volume 184, article beginning on page 163 (1950). The control values obtained averaged about 1200 such units, as compared to about 1500 reported by these authors.

The in vivo tests were made with rats and were noted by a strong reduction of uric acid concentration in the blood, upon ingestion of the above oxygenated chalcones. In view of the solubility of uric acid in the body fluids, reduction in blood uric acid will cause deposited uric acid to gradually dissolve and thereby alleviate and finally remove the symptoms. This treatment which only required the administration two to four times per day of about 1 to 10 milligrams of the chalcone per kilogram of body weight, is advantageously coupled with administration of adreno-cortico-tropic hormone (ACTH) which gives an exceedingly prompt, though temporary relief. Variations can be made as desired by the attending physician.

It is not necessary to administer the oxygenated chalcone orally. Parenteral injection in the form of aqueous solutions, preferably isotonic saline, having concentrations of about 1 to 100 micrograms per cc. is also satisfactory. Inasmuch as the chalcone appears to have no direct solubilizing action on uric acid, the injections need not be made at or near the affected joint, but can be made anywhere in the body, as for example intramuscularly, intravenously, etc.

The 3,4,3',4'-tetrahydroxy chalcone of the present invention was made as follows:

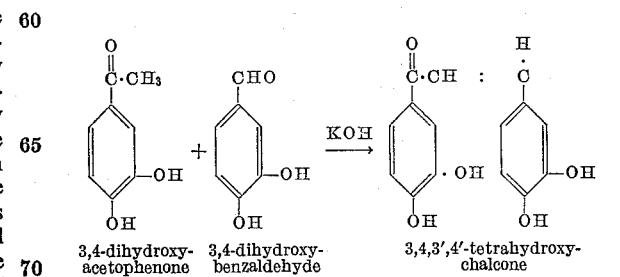

3,4-dihydroxy-acetophenone   3,4-dihydroxy-benzaldehyde   3,4,3',4'-tetrahydroxy-chalcone a. 3,4-dihydroxybenzaldehyde was prepared according to the direction of Buch and Zimmerman, Organic Syntheses, Collected Series, volume II, page 549 (1943).

b. 3,4-dihydroxyacetophenone was prepared according to the directions of Hartung, Journal of the American Society, volume 60, page 7 (1938).

c. Three hundred grams (g.) of ice cold 60% potassium hydroxide solution in water was added with cooling to an ice cold solution of 95 g. of 3,4-dihydorxybenzaldehyde and 25 g. of 3,4-dihydroxyacetophenone in 80 cc. of ethyl alcohol. The reaction container was stoppered and allowed to stand at room temperature (25° C).

After 7 days the mixture was acidified with ice and hydrochloric acid containing a trace of sulfur dioxide. The precipitate thus formed was filtered, dissolved in ethyl acetate and the resulting solution filtered. The filtered solution was concentrated by evaporation to 50 cc. and while hot, benzene was added causing the precipitation of 12 g. of yellow crystals melting at 230–231° C. By analysis the following comparative data was obtained:

Calculated for $C_{15}H_{12}O_5$: C, 66.20; H, 4.41. Found: C, 66.05, 66.07; H, 4.28, 4.53

3,4,3′,4′-tetrahydroxy chalcone was also prepared by dissolving a mixture of 7.5 g. of 3,4-dihydroxyacetophenone and 8 g. of 3,4-dihydroxybenzaldehyde in 200 cc. of 10% aqueous sodium hydroxide and letting the solution stand at room temperature for 5 days. Acidification with hydrochloric acid yielded a precipitate which upon crystallization from ethyl acetate gave the yellow chalcone melting at 230–231° C.

3′,4′-dihydroxy-3,4-methylenedioxy chalcone was prepared in the following manner:

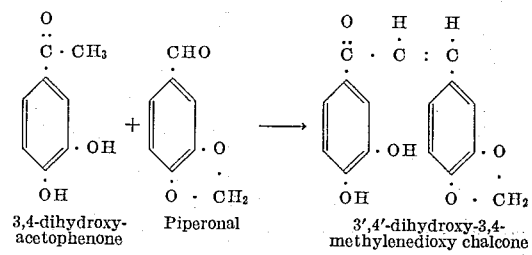

3,4-dihydroxy-acetophenone    Piperonal    3′,4′-dihydroxy-3,4-methylenedioxy chalcone A mixture of 5 g. of piperonal, 5 g. of 3,4-dihydroxyacetophenone and 15 g. of potassium hydroxide was dissolved in 60 cc. of 50% ethanol in water by volume, and the solution refluxed on a steam bath. After one hour the mixture was acidified with hydrochloric acid and allowed to cool in ice water. The precipitate that formed was filtered and crystallized from 75% methanol in water by volume. About 2 g. of a yellowish crystalline product was obtained.

The other oxygenated chalcones are made in the same manner using the corresponding substituted or unsubstituted benzaldehyde and the required substituted acetophenone. The desired substituted acetophenones are in general prepared by acetylating the corresponding hydroxy-, methoxy-, or methylene dioxy-benzenes with acetyl chloride, and then reacting the acetylated product with aluminum chloride in nitrobenzaldehyde. Upon decomposition of the final reaction mixture with aqueous acid, a residue containing the desired acetophenone is produced and this product can be extracted and purified as by means of a toluene solvent.

As many apparently widely different embodiments of this invention may be made without departing from the spirit and scope hereof, it is to be understood that the invention is not limited to the specific embodiments hereof, except as defined in the appended claims.

What is claimed is:

1. A therapeutic chalcone having the formula

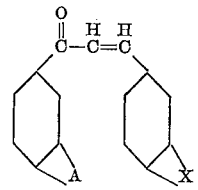

in which A represents substitution of the class consisting of two hydroxyl groups, two methoxy groups and one methylene dioxy group, X represents substitution of the class consisting of two hydrogen groups, two hydroxyl groups, two methoxy groups and one methylene dioxy group, and at least one of the substituents A and X is two hydroxyl groups.

2. 3,3′,4,4′-tetrahydroxychalcone.
3. 3′,4′-dihydroxy-3,4-methylene dioxy chalcone.
4. 3′,4′-dihydroxychalcone.
5. 3′,4′-dihydroxy-3,4-dimethoxy chalcone.

References Cited in the file of this patent

UNITED STATES PATENTS

| | | |
|---|---|---|
| 2,199,389 | Britton et al. | May 7, 1940 |
| 2,326,068 | Rohrmann | Aug. 3, 1943 |
| 2,381,210 | Cotton | Aug. 7, 1945 |
| 2,425,269 | Seymour | Aug. 5, 1947 |
| 2,452,188 | Hedenburg | Oct. 26, 1948 |
| 2,496,697 | Chapin | Feb. 7, 1950 |
| 2,505,483 | Green | Apr. 25, 1950 |

OTHER REFERENCES

Sonn et al.: C. A. 25, p. 5411 (1931).
Perkin et al.: J. Chem. Soc. 85, 1468 (1904).
Kauffmann et al.: Berichte 46, 3788–3801 (1913).